(12) United States Patent
Oki et al.

(10) Patent No.: US 6,733,268 B2
(45) Date of Patent: May 11, 2004

(54) DIVIDING APPARATUS

(75) Inventors: Yuzuru Oki, Kanagawa (JP); Hiroshi Noda, Kanagawa (JP)

(73) Assignee: Oshikiri Machinery Ltd., Tokyo (JP)

( * ) Notice: Subject to any disclaimer, the term of this patent is extended or adjusted under 35 U.S.C. 154(b) by 108 days.

(21) Appl. No.: 09/967,378

(22) Filed: Sep. 28, 2001

(65) Prior Publication Data

US 2002/0037337 A1 Mar. 28, 2002

(30) Foreign Application Priority Data

Sep. 28, 2000 (JP) ........................................ 2000-297711

(51) Int. Cl.⁷ ................................................ A21C 5/00
(52) U.S. Cl. .................... 425/192 R; 425/311; 425/463; 425/466
(58) Field of Search .............................. 425/311, 192 R, 425/310, 466, 463

(56) References Cited

U.S. PATENT DOCUMENTS

| 916,827 A | * | 3/1909 | Bangs ........................ 425/182 |
| 4,128,372 A | * | 12/1978 | Rose et al. .................. 425/311 |
| 4,167,386 A | * | 9/1979 | Mallay ........................ 425/463 |
| 4,380,424 A | * | 4/1983 | Skoch et al. ................. 425/331 |
| 4,384,842 A | * | 5/1983 | Cavalli ........................ 425/463 |
| 4,698,009 A | * | 10/1987 | Marin et al. ................. 425/196 |
| 4,856,974 A | * | 8/1989 | Wolfe, Jr. .................... 425/67 |
| 5,486,102 A | * | 1/1996 | Ettie et al. .................. 425/202 |
| 5,747,077 A | * | 5/1998 | Yoshida et al. ............. 425/183 |

FOREIGN PATENT DOCUMENTS

JP          56-87424       *  7/1981

* cited by examiner

Primary Examiner—Robert Davis
Assistant Examiner—Joseph S. Del Sole
(74) Attorney, Agent, or Firm—Brinks Hofer Gilson & Lione

(57) ABSTRACT

In a dividing apparatus A in which dough brought in through a hopper is extruded from an extruder 8 by a screw 71, dough is divided by cutting it into pieces of set length. The dividing apparatus A comprises a support plate provided for installation therein of a outlet member 1 of the extruder 8 and a cutter 9 for cutting off extruded dough D by sliding along the support plate 2. The outlet member 1 comprises a reducer 11 and a flange 12 formed such as to extend therefrom. The flange 12 is configured for ease of installation on, and removal from, the support plate 2.

5 Claims, 7 Drawing Sheets

DIVIDING APPARATUS

BACKGROUND OF THE INVENTION

The present invention is related to dividing apparatus for dividing dough, and more specifically, to dividing apparatus for making dough pieces by taking dough brought in through a hopper, pressing it out through an extruder under pressure, and cutting it into set lengths.

Baked goods such as bread and pastry are made by dividing dough into individual pieces containing a given amount of dough (dividing process), and rounding these divided dough pieces as required to form rounded balls (rounding process). After the rounding process, the round balls are formed, for example, into specific shapes products of which are to be made. The shaped dough balls are then baked to produce the products (baking process). Also, to minimize the escape of gas, the shape obtained in the rounding process should have a minimum of surface area. A key point for quality, then, is to obtain a shape that is as nearly spherical as possible.

Currently, dividing apparatus is used to obtain divided dough pieces having a given amount of dough for the rounding process. As shown in the drawings attached hereto, such a dividing apparatus A is a device for making divided dough pieces by taking in dough through a hopper 6, pressing it out through an extruder with pressure applied by a screw 71, and cutting it into fixed lengths.

In a conventional dividing apparatus A, an outlet member 1 of specific diameter is provided integrally at the output end of the extruder. A cylindrical dough of set cross-sectional diameter is continuously expelled from this outlet member 1, after which it is cut into dough pieces of a given length by a cutter 9. FIGS. 7(A), 7(B) and 7(C) show typical dough pieces cut in this manner. The size of the outlet member 1 is defined in the specifications of the dividing apparatus. Since the diameter of the dough pieces expelled from the outlet member 1 is always the same, the size of the dough pieces can only be adjusted by changing the length of the dough D; not its diameter.

In the rounding process, then, when small dough pieces (pieces containing a small amount of dough) are required, short dough pieces are made (FIG. 7(A)); and when large dough pieces (pieces containing a large amount of dough) are required, long dough pieces are made (FIG. 7(B)). When a lot change is made, e.g. a change from a product A lot to a product B lot, where product A is a large-sized product made with a large amount of dough, and product B is a small-sized product made with a small amount of dough, a corresponding change must be made in the dividing apparatus to switch from making divided dough pieces containing a large amount of dough (large dough pieces) to making divided dough pieces containing a small amount of dough (small dough pieces).

When this is done, since the diameter of the dough pieces is determined by the outlet member 1 of the dividing apparatus, as discussed above, dough pieces that are to contain more dough (large dough pieces) are always made longer, and dough pieces that are to contain less dough (small dough pieces) are always made shorter. This ensures that the dough pieces are divided so as to have the amount of dough they are required to have in the rounding process to follow.

The problem with this, however, is that in the rounding process, where the dough pieces are formed into a spherical shape by the rounding apparatus, longer dough pieces put a greater load on the apparatus. That is, when 'rounder bars' are used in the rounding process for forming the dough pieces into a spherical shape, a longer rounder bar is required for rounding longer dough pieces. The less spherical the shape of the dough piece at the start of the process, the harder it is to round. For this reason, it is important to divide up the dough in a manner that provides the shortest possible dough piece length. In other words, rather than have a long, thin dough piece as shown in FIG. 7(B), it is better to have the more nearly spherical dough piece shape of FIG. 7(C).

SUMMARY OF THE INVENTION

The present invention was devised to solve the above problem. That is, it is an object of the present invention to provide a dividing apparatus that can quickly be adapted to accommodate different lots, and also to provide a dividing apparatus wherein its outlet member can be exchanged easily.

Accordingly, the present inventors undertook an extensive study of the problem during which it was found that the problem could be solved by providing a dividing apparatus with an extruder having an outlet member that would be easy to exchange. The present invention was then perfected based on this finding.

That is, in a first aspect thereof, the present invention provides a dividing apparatus in which dough taken in through a hopper is pressed out of an extruder by a screw, and divided by cutting it into pieces of set length, wherein the extruder has a replaceable outlet member.

Also, in a second aspect thereof, the invention provides a dividing apparatus in which dough taken in through a hopper is pressed out of an extruder by a screw, and divided by cutting it into pieces of set length, the apparatus comprising a support plate for installation of an outlet member of the extruder and a cutter for sliding along the support plate for cutting off extruded dough, wherein the outlet member is made readily installable on and removable from the support plate, for exchanging the outlet member.

Also, in a third aspect thereof, the present invention provides a dividing apparatus in which dough taken in through a hopper is pressed out of an extruder by a screw, and divided by cutting it into pieces of set length, the apparatus comprising a vertical support plate for installation of an outlet member of the extruder and a cutter for sliding along the support plate for cutting off extruded dough, wherein the outlet member further comprises a reducer and a flange extending vertically therefrom, and wherein the flange is readily removable from the support plate.

Also, in a fourth aspect thereof, the present invention provides a dividing apparatus as in the above third aspect, wherein fastening bolts are threaded into the support plate, a pair of slots is formed in the flange for receiving fastening bolts therein, and the flange is fastened to the support plate by mating the fastening bolts with the slots, and tightening the bolts.

Also, in a fifth aspect thereof, the present invention provides a dividing apparatus as in the above third aspect, wherein the shape of the inner circumferential surface of the reducer of the outlet member has a gradually enlarging shape.

Also, in a sixth aspect thereof, the present invention provides a dividing apparatus as in the above third aspect, wherein the cutter cuts dough by rotating while sliding in contact with a surface of the support plate.

Also, in a seventh aspect thereof, the present invention provides a dividing apparatus as in the above third aspect, wherein the output end of the outlet member is flush with a surface of the support plate, and an opening in the support plate is provided within the range of rotation of the cutter.

BRIEF DESCRIPTION OF THE DRAWING

These and other features, aspects, and advantages of the present invention will become apparent with reference to the following description, claims, and accompanying drawings, where:

DETAILED DESCRIPTION OF THE INVENTION

Figure 1:
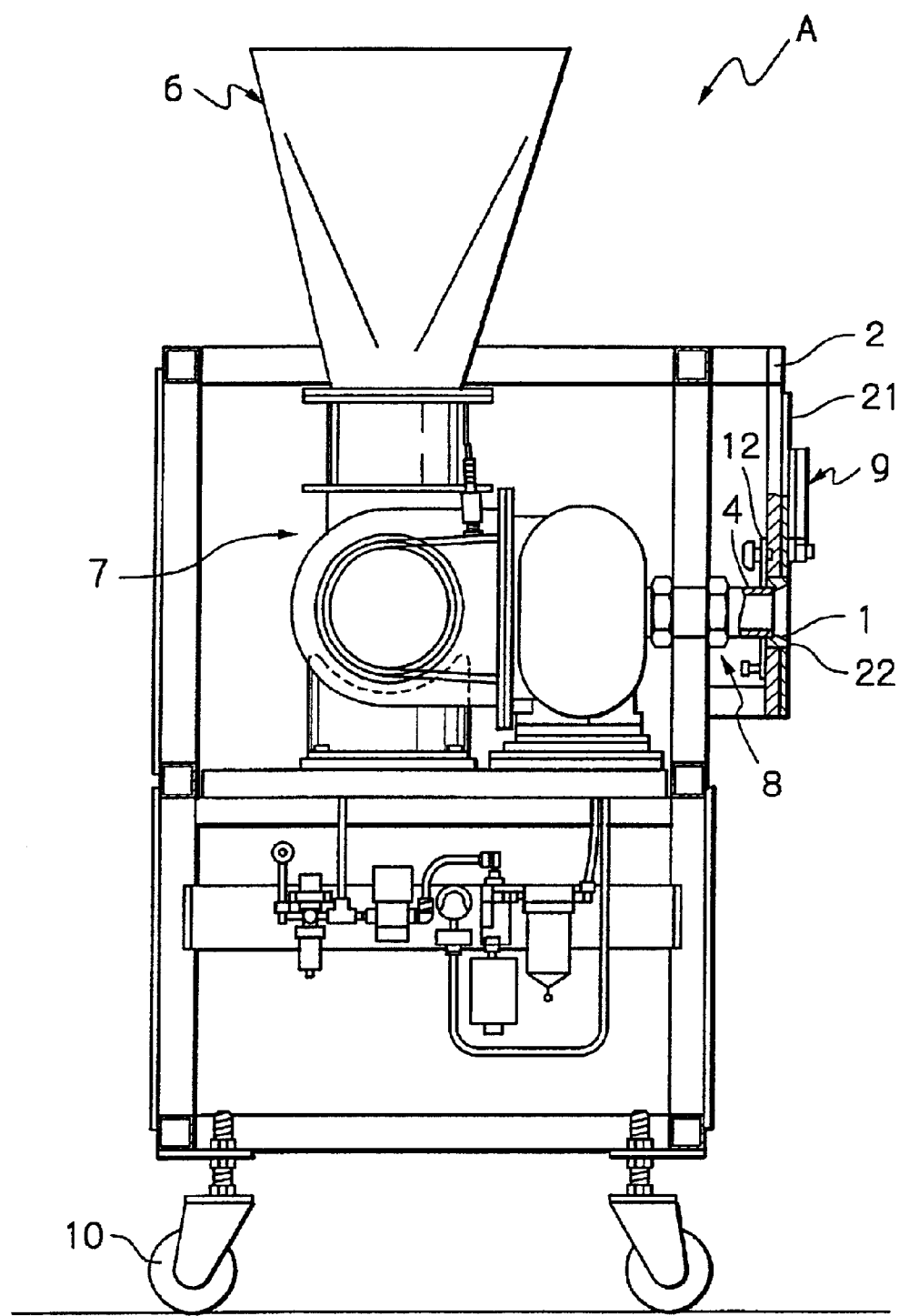
FIG. 1 shows a simplified side view of an entire dividing apparatus.
Figure 2:
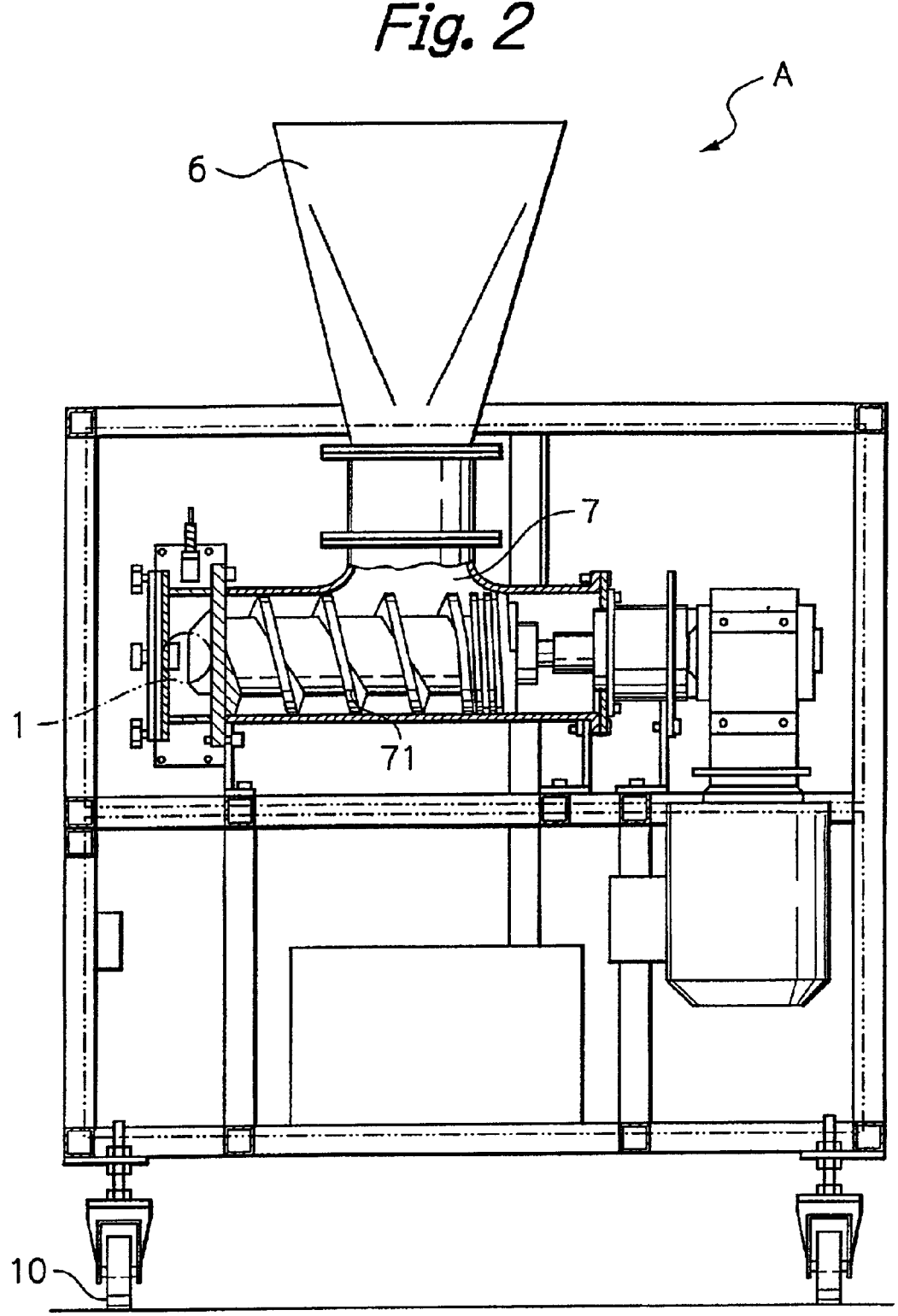
FIG. 2 shows a simplified frontal view of an entire dividing apparatus.

The best mode for carrying out the present invention is described below, with reference to the drawings. FIG. 1 is a simplified partial cut-away frontal view of the entire dividing apparatus A of the present invention, and FIG. 2 is a simplified partial cut-away side view of the entire dividing apparatus A. A rounding apparatus (not shown in the drawing) is placed downstream of the dividing apparatus A for rounding dough pieces continuously supplied to it from the dividing apparatus A.

The dividing apparatus A comprises a hopper 6 for receiving dough D from outside of the apparatus; a main unit 7 for receiving dough from the hopper 6; an extruder 8 for extruding therefrom the dough in the main unit 7; and a cutter 9 for cutting dough thus extruded. Also provided, at the bottom of the frame of the apparatus, are casters 10, for enabling the entire apparatus to be moved as required.

A screw 71 enclosed within the main unit 7 rotates, exerting pressure on dough D being brought in through the hopper 6, thus causing the dough D to be extruded from the extruder 8.

The extruder 8 is provided with an outlet member 1. The outlet member 1 is supported by a support plate 2 that is part of the frame of the dividing apparatus A. More specifically, the outlet member 1 is installed by fitting an end thereof into an opening 22 bored in the support plate 2.

Also installed on the support plate 2 is a cutter 9 having a cutting blade 91 (made, for example, of polyethylene). The cutter 9 is installed such that the cutting blade 91 slides along the surface of the support plate 2 in contact therewith as the cutter 9 rotates.

Figure 3:
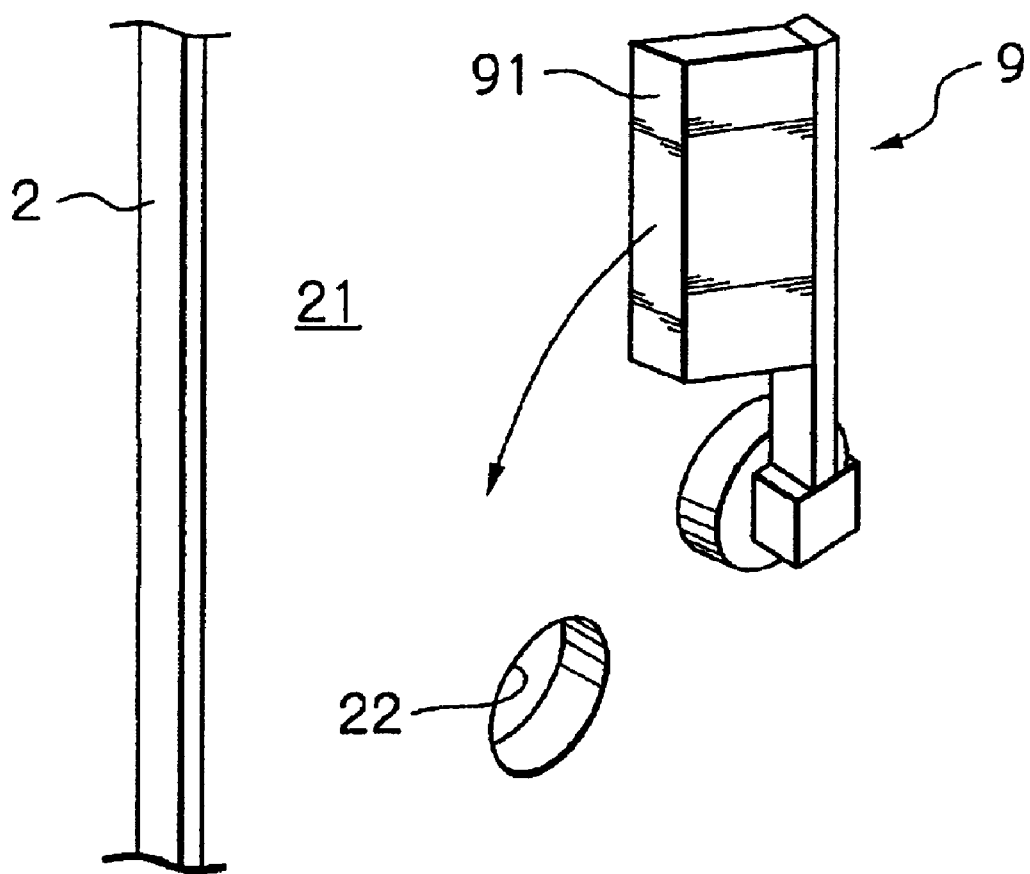
FIG. 3 shows the area around a cutter installed on a support plate.

FIG. 3 shows the cutter 9 installed on the support plate. Here, a sheet plate 21 made of a material (such as polyacetal) of the characteristic against wearing under the friction of the cutting blade 91, is attached to the support plate. It is the surface of this sheet plate 21 that is in contact with the cutting blade 91. When replacement is necessary due to wear, for example, instead of replacing the entire support plate 2, only the protective sheet plate 21 needs be replaced.

When the cutting blade 91 slides past the opening 22 of the support plate 2 (the opening into which the end of the outlet member is fitted), it cuts off dough D being expelled from the opening 22. As will be described later, the cutter 9 is rotatably installed on the support plate 2 for slicing into sections, the dough D being expelled from the opening 22 of the support plate 2.

Next, the structure of the extruder 8 of the dividing apparatus A will be described. As mentioned earlier, the extruder 8, which has a outlet member 1 provided at its output end, is that part of the apparatus in which the dough D receives pressure exerted by a rotating screw 71 enclosed within the main unit 7, thus causing the dough D to be extruded through the outlet member 1.

The outlet member 1 comprises a cylindrical reducer 11, and a flange 12 formed of two wing pieces extending vertically in the radial direction thereof. The installed outlet member 1 can be removed and replaced with an outlet member 1 having a different-sized opening, in order to support requirements for dough pieces of different sizes. As will be discussed later, the flange 12 is used to attach the outlet member 1 to the support plate 2.

Figure 4A:
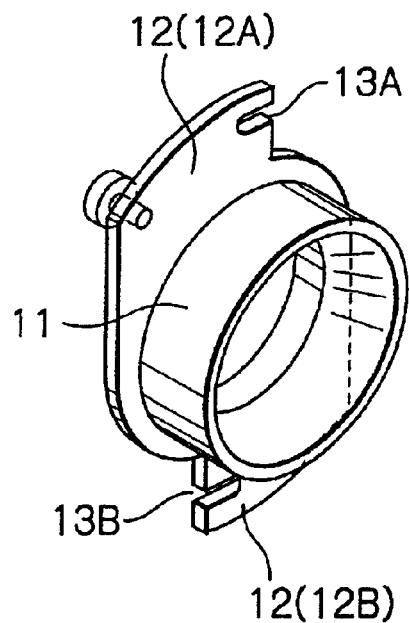
FIGS. 4(A) and 4(B) show oblique views of two outlet members of different size, with a large bore outlet member shown (FIG. 4(A)), and a smaller bore outlet member shown at (FIG. 4(B))
Figure 4B:
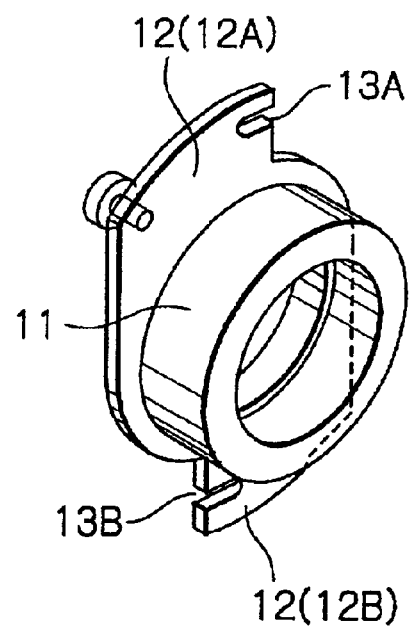
Figure 5A:
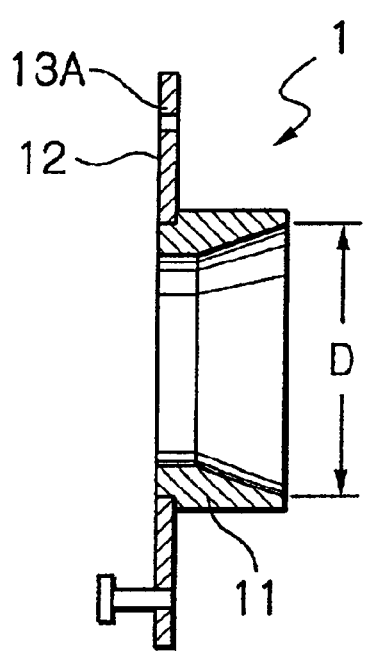
FIGS. 5(A) and 5(B) show a cross-section view of large bore outlet member (FIG. 5(A)), and a frontal view (FIG. 5(B))
Figure 5B:
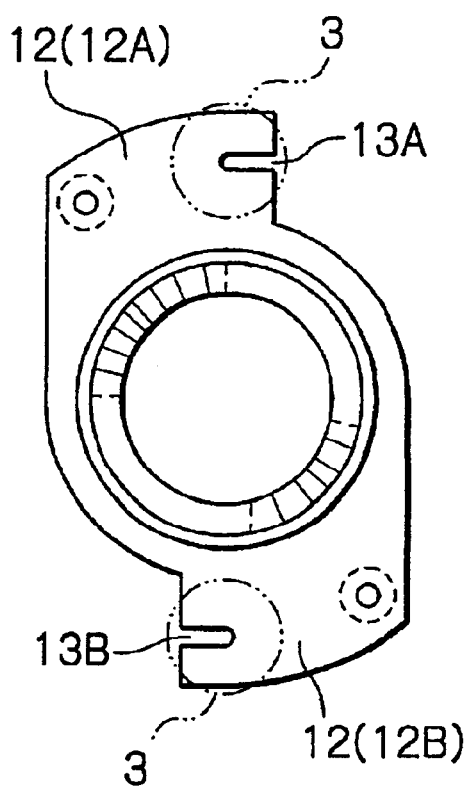

FIGS. 4(A) and 4(B) show an oblique view of two examples of outlet members of different sizes, with a large diameter outlet member shown (FIG. 4(A)), and a smaller diameter outlet member shown (FIG. 4(B)). FIGS. 5(A) and 5(B) show additional views of the larger of these two outlet members, with a cross-section view shown (FIG. 5(A)), and a frontal view (FIG. 5(B)).

The outlet member shown in FIG. 4(A) is used to produce dough pieces that contain a comparatively large amount of dough (large dough pieces). The inside of the reducer 11 of the outlet member 1 has an inclined surface. The size (in circumference) of the dough D being pressed out through the outlet member 1 is determined by the diameter D at the large-diameter end of the reducer opening. Provided at the rear end of the reducer 11, extending in the radial direction thereof, is the flange 12 (comprising wing pieces 12A and 12B).

The outlet member shown in FIG. 4(B) is used to produce dough pieces that contain a comparatively small amount of dough (small dough pieces). It is interchangeable with the outlet member shown in FIG. 4(A). The inside of this reducer 11, however, has a constant set diameter (L1). Provided at the rear end of this reducer 11 as well, extending in the radial direction thereof, is the flange 12 (comprising wing pieces 12A and 12B).

The reducers 11 of these outlet members 1 are fitted into the opening 22 of the support plate 2, thus supporting the outlet member in the support plate 2. When fully inserted in the opening 22 of the support plate 2, the forward end face of the outlet member 1 is flush with the front of the support plate 2.

The flange 12 of the outlet member is placed against the back of the support plate 2, and fastened using a bayonet-type mounting. That is, a pair of oblong slots 13 (13A and 13B), are formed in the flange in a diametrically opposite fashion. More specifically, the flange 12 is provided diametrically with wing pieces 12A and 12B, and the oblong slots 13A and 13B are formed in the wing pieces 12A and 12B, respectively, in such a manner that these slots open in the same clockwise direction. A pair of fastening bolts 3 are threaded into the support plate 2 on opposite sides of the opening 22. The outlet member is fastened on the support plate 2 by the heads of the fastening bolts 3 tightened through the respective slots 13A and 13B.

Figure 6A:
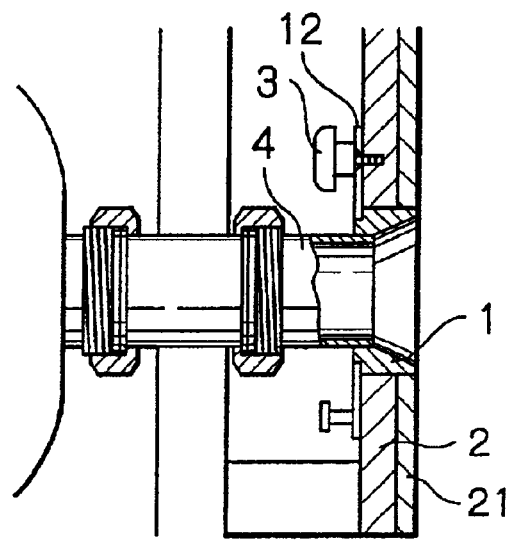
FIGS. 6(A), 6(B) and 6(C) show the outlet member exchange procedure with respect to the extruder.
Figure 6B:
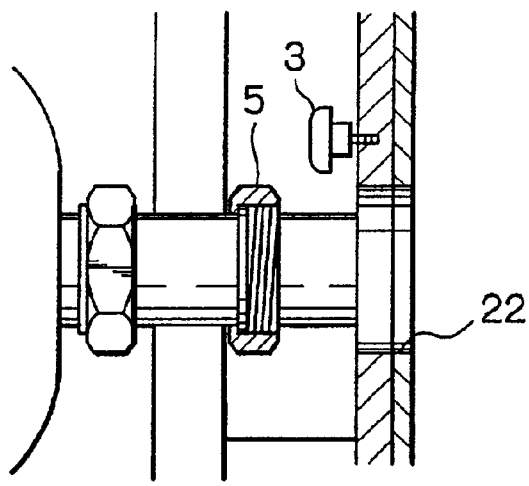
Figure 6C:
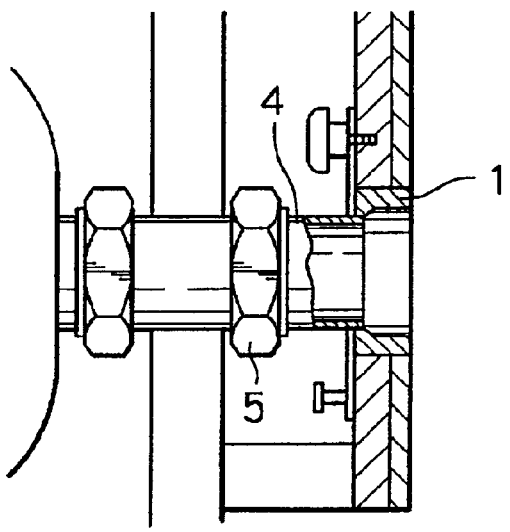
Figure 7A:
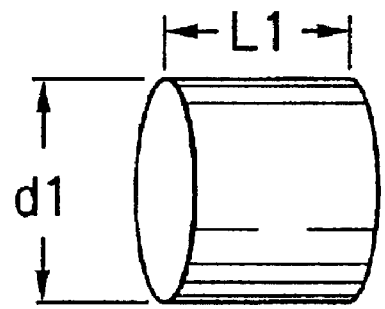
FIGS. 7(A), 7(B) and 7(C) show examples of typical dough pieces of different sizes.
Figure 7B:
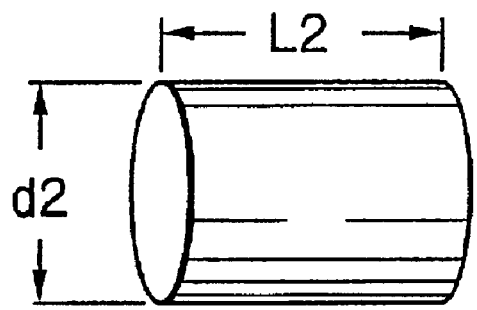
Figure 7C:
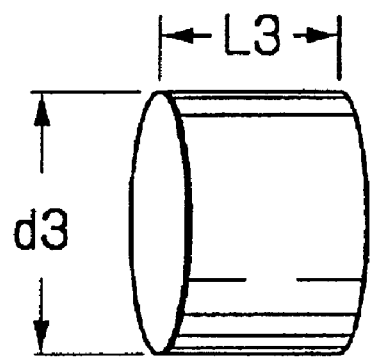

Next, a procedure for changing from a large bore outlet member to a small bore outlet member in order to set up for a new dough lot will be described. FIGS. 6(A), 6(B) and 6(C) show the outlet member exchange procedure with respect to the extruder 8.

FIG. 6(A) shows the large-bore outlet member 1 to be removed, in its installed state. Prior to removing the outlet member, an outlet member installation coupling 4, which connects the outlet member to the extruder 8, is removed from the extruder 8 by loosening a linkage nut 5.

Next, the fastening bolts 3 installed in the support plate 2 are loosened, and the outlet member 1 is turned to disengage the fastening bolts 3 from the oblong slots 13. The outlet member 1 can now be pulled away from the back of the support plate 2, and removed. (See FIG. 6(B).)

Next, the smaller bore replacement outlet member 1 is installed by aligning the opening of its reducer 11 with the opening 22 in the support plate 2 and inserting it until its flange 12 makes contact with the back of the support plate 2. (At this point, the forward end of the outlet member will be flush with the front surface of the support plate 2.) The outlet member 1 is now rotated to engage the slots 13 of the flange 12 with the fastening bolts 3.

Next, the fastening bolts 3 are tightened, securing the flange 12 to the support plate 2. Finally, the installation coupling 4 is fitted between the extruder 8 and the outlet member 1, and secured by tightening the linkage nut 5, to thus complete the installation of the outlet member 1. (See FIG. 6(C).)

In the dividing apparatus A of the present invention, outlet members of different diameters can be exchanged by a simple procedure. Therefore, when the amount of dough contained in the individual dough pieces is to be changed, this can be accomplished by adjusting the diameter of the dough, without increasing the length of the dough pieces, thus making it possible to produce dough pieces of near-spherical shape.

For this reason, when lots in which dough pieces containing different amounts of dough are required, one need simply selects an outlet member of the proper size.

In operation, the dough D is continuously extruded from the outlet member and, the cutter 9 rotates at a given period of rotation in sliding contact with the front surface of the support plate 2 (i.e., in contact with the surface of the sheet material 21), to produce divided dough pieces cut to the prescribed length.

Here, unlike dough pieces divided by the conventional dividing apparatus stated above, dough pieces divided by the dividing apparatus of the present invention are not long and more nearly spherical. This enables the rounding task to be performed with much greater efficiency.

Although the preferred embodiment of the invention was described above, a variety of modifications thereto are possible while still remaining within the scope of the stated objectives. For example, although the cutter 9 was described as a rotating device, the cutting could also be performed in a reciprocating back-and-forth action.

Also, in the above example, the flange 12 used to support and secure the outlet member on the support plate had a pair of wing pieces, but it could, for example, instead have an annular flange portion extending around the entire circumference. There are virtually no restrictions on the shape of this part.

A dividing apparatus with multiple outlet members could also be used by providing an extruder portion with branched outlets. This, of course, would require a corresponding increase in the number of openings in the support plate as well as in the number of outlet members.

According to the present invention as described above, a variety of different lots can quickly be supported by a simple exchange of outlet members. This results in dough being supplied to the rounding process in an easily workable form, thus reducing the load on the rounding process. Also, providing a mounting flange for the outlet member provides secure installation of the outlet member on the support plate, with easy outlet member replacement.

What is claimed is:

1. A dividing apparatus comprising:
   a dough receiving body comprising a dough extruder, the extruder having an opening for extruding a dough received in the dough receiving body;
   at least two dough outlet members each defining a dough outlet opening, the dough outlet openings of the dough outlet members being different from each other in size, the dough outlet members being selectively installed into the dividing apparatus such that the dough outlet opening of the installed dough outlet member being communicated with the opening of the extruder for allowing the dough extruded through the opening of the extruder to move outside the dividing apparatus;
   a cutter cutting the dough extruded through the dough outlet opening into pieces of a predetermined length; and
   a support plate for detachably supporting the dough outlet member, the support plate including an opening for receiving any one of the dough outlet members therein and having outer and inner surfaces, wherein the cutter is slidable along the outer surface of the support plate, the dough outlet member has outer and inner ends, the outer end of the dough outlet member received in the opening of the support plate is flush with the outer surface of the support plate, and the inner end of the same is connected to the opening of the extruder.

2. A dividing apparatus as recited in claim 1 wherein the inner end of the dough outlet member is provided with a flange which is detachably connected to the inner surface of the support plate.

3. A dividing apparatus as recited in claim 2 wherein the flange of the dough outlet member is detachably connected to the support plate by a bayonet-type fastening tool comprising a pair of slots formed in the flange of the dough outlet member and a pair of corresponding bolts threadably engaged with the inner surface of the support plate and engaged with the slots of the flange.

4. A dividing apparatus as recited in claim 1 wherein the dough outlet member includes a dough passage extending through the dough outlet member from the inner end to the outer end thereof and having outer and inner openings in the outer and inner ends of the dough outlet member, the opening of the passage formed in the outer end of the dough outlet member defining the dough outlet opening, the dough passage including a portion tapered extending from the opening in the outer end towards the inner end.

5. A dividing apparatus as recited in claim 1 wherein the cutter is rotatably mounted on the outer surface of the support member so that the cutter moves across the dough outlet opening of the dough outlet member.

* * * * *